No. 741,259. Patented October 13, 1903.

UNITED STATES PATENT OFFICE.

WILLIAM A. LAWRENCE, OF NEW YORK, N. Y., ASSIGNOR TO CONTINENTAL RUBBER COMPANY, OF JERSEY CITY, NEW JERSEY, A CORPORATION OF NEW JERSEY.

COMPOSITION OF MATTER.

SPECIFICATION forming part of Letters Patent No. 741,259, dated October 13, 1903.

Application filed October 6, 1902. Serial No. 126,087. (No specimens.)

*To all whom it may concern:*

Be it known that I, WILLIAM A. LAWRENCE, a citizen of the United States, residing in the borough of Queens, city and State of New York, have invented a certain new and useful Composition of Matter, of which the following is a specification.

The composition forming the subject-matter of the present application is produced as a by-product in the carrying out of a process for the extraction of rubber or rubber-like gums from plants invented by me and fully described and claimed in an application, Serial No. 114,082, filed July 2, 1902, of which this application is a division.

In the carrying out of the above-mentioned process I treat certain rubber-bearing plants with a solvent for the rubber or rubber-like gum contained therein. The solvents which I have found to be most suitable for this purpose are hydrocarbons—such as naphtha, gasolene, benzin, benzole, toluene, &c.—and also ether, chloroform, carbon bisulfid, and carbon tetrachlorid. These reagents are all good solvents of rubber, and they readily dissolve the rubber or rubber-like particles contained in the plants and may then be drawn off therefrom. Certain of the plants which I treat in this manner contain a considerable amount of resin or resinous matter, and this matter is also dissolved by the solvents mentioned. The next step in the process of extracting the gum is the partial evaporation of the solvent from the solution. After the solution has become somewhat thickened from this cause further evaporation becomes more difficult, and I therefore at this point treat the solution with an alkaline solution, preferably a solution of sodium hydrate or caustic soda. The alkaline solution effects a complete separation of the gums from the extracting solvent and also from the resinous matter. This separation is primarily due to the fact that the alkali is a good solvent for the resins and is not a solvent for the rubber or rubber-like gums. The dissolving out of the resinous matter by the alkaline solution from the thickened mass of gum, resin, and the residue of the extracting solvent breaks up the mass very thoroughly, and when the alkaline solution is kept hot, as I prefer to have it, the residue of the extracting solvent, being of a volatile nature, is for the most part speedily evaporated. The alkaline solution also acts to some extent as a solvent for the said residue of the extracting solvent, this fact also contributing to the effective separation of the gum. The gum rises to the surface as the alkaline solution cools and may be readily drawn or skimmed off. I then have remaining a very useful and valuable product, containing alkali, resin, and some naphtha or other rubber solvent. Such a product requires only the combination therewith of the oils or fats commonly used in soap-making to produce a valuable soap. Both the resin and naphtha, or the resin alone if most of the naphtha has been evaporated from the solution, form a desirable ingredient of the soap.

What I claim as my invention is—

1. As a new composition of matter, an alkaline solution of naphtha and resin derived from rubber-bearing plants, substantially as described.

2. As a new composition of matter, an alkaline solution of resin derived from rubber-bearing plants and a hydrocarbon, substantially as described.

3. As a new composition of matter, an alkaline solution of both resin derived from rubber-bearing plants and a solvent for gum and resin, substantially as described.

4. As a new composition of matter, the solution which comprises a solvent for both the gum and resin of rubber-bearing plants, said resin itself, and a solvent for the resin which is not a solvent of the gum, substantially as described.

5. As a new composition of matter, an alkaline solution containing resin derived from a plant of the genus *Parthenium* and a solvent for both the gum and resin of the said plant, substantially as described.

6. A composition of matter consisting of a solvent for both the gum and resin of a plant of the genus *Parthenium*, the resin of said plant, and a solvent for said resin, which is a non-solvent of the gum, substantially as described.

In witness whereof I have hereunto set my hand this 1st day of October, 1902.

WILLIAM A. LAWRENCE.

In presence of—
 JAMES J. COSGROVE,
 DELOS HOLDEN.